US012119606B2

(12) United States Patent
Hirooka et al.

(10) Patent No.: US 12,119,606 B2
(45) Date of Patent: Oct. 15, 2024

(54) TERMINAL BLOCK

(71) Applicants: AUTONETWORKS TECHNOLOGIES, LTD., Yokkaichi (JP); SUMITOMO WIRING SYSTEMS, LTD., Yokkaichi (JP); SUMITOMO ELECTRIC INDUSTRIES, LTD., Osaka (JP)

(72) Inventors: Toshiya Hirooka, Yokkaichi (JP); Daisuke Hashimoto, Yokkaichi (JP); Jisung Kim, Yokkaichi (JP); Kan Murai, Yokkaichi (JP); Yasuhiro Kudo, Yokkaichi (JP)

(73) Assignees: AUTONETWORKS TECHNOLOGIES, LTD., Mie (JP); SUMITOMO WIRING SYSTEMS, LTD., Mie (JP); SUMITOMO ELECTRIC INDUSTRIES, LTD., Osaka (JP)

( * ) Notice: Subject to any disclaimer, the term of this patent is extended or adjusted under 35 U.S.C. 154(b) by 377 days.

(21) Appl. No.: 17/786,706

(22) PCT Filed: Dec. 24, 2020

(86) PCT No.: PCT/JP2020/048330
§ 371 (c)(1),
(2) Date: Jun. 17, 2022

(87) PCT Pub. No.: WO2021/140925
PCT Pub. Date: Jul. 15, 2021

(65) Prior Publication Data
US 2023/0023796 A1 Jan. 26, 2023

(30) Foreign Application Priority Data
Jan. 7, 2020 (JP) ................................ 2020-000833

(51) Int. Cl.
*H01R 9/24* (2006.01)

(52) U.S. Cl.
CPC .......... *H01R 9/24* (2013.01); *H01R 2201/26* (2013.01)

(58) Field of Classification Search
CPC ... H01R 9/24; H01R 2201/26; H01R 13/5202
See application file for complete search history.

(56) References Cited

U.S. PATENT DOCUMENTS 5,947,766 A * 9/1999 Tsuji .................... H01R 13/748 439/564
6,953,357 B2 * 10/2005 Fukushima ........ H01R 13/5219 439/271

(Continued)

FOREIGN PATENT DOCUMENTS

JP 2003-11749 A 1/2003
JP 2011-160619 A 8/2011

(Continued)

OTHER PUBLICATIONS

Mar. 23, 2021 International Search Report issued in International Patent Application No. PCT/JP2020/048330.

*Primary Examiner* — Thanh Tam T Le
(74) *Attorney, Agent, or Firm* — Oliff PLC

(57) ABSTRACT

A terminal block including: a connector that has a tubular shape; and a seating that is formed on an outer periphery of the connector, and is to be fixed to the housing so as to close an opening of the housing, wherein: the seating includes: a first wall that extends in a direction that intersects an axial direction of the connector; a second wall that faces the first wall in the axial direction of the connector; a rib that is provided between the first wall and the second wall so as to connect the first wall and the second wall with each other; and a space that is partitioned by the rib between the first (Continued)

wall and the second wall, and the space is open in a direction that intersects the axial direction of the connector.

7 Claims, 4 Drawing Sheets

(56) References Cited

U.S. PATENT DOCUMENTS

| | | | | |
|---|---|---|---|---|
| 8,167,634 | B2 * | 5/2012 | Fujiwara | H01R 13/5202 439/271 |
| 8,979,580 | B2 * | 3/2015 | Bitzer | H02K 5/10 439/271 |
| 8,992,249 | B2 * | 3/2015 | Kobayashi | H01R 13/6581 439/564 |
| 9,379,478 | B2 * | 6/2016 | Fabre | H01R 13/5202 |
| 9,431,756 | B2 * | 8/2016 | Kataoka | H01R 13/5219 |
| 10,224,666 | B2 * | 3/2019 | Aoshima | H01R 13/648 |
| 10,340,626 | B2 * | 7/2019 | Kondo | H01R 13/5202 |
| 11,088,489 | B2 * | 8/2021 | Takagi | H02G 15/04 |
| 2002/0031949 | A1 * | 3/2002 | Miyazaki | H01R 13/5202 439/625 |
| 2015/0099385 | A1 * | 4/2015 | Ikeya | H01R 12/7005 439/271 |

FOREIGN PATENT DOCUMENTS

| | | | |
|---|---|---|---|
| JP | 2014-130749 | A | 7/2014 |
| JP | 2017-103011 | A | 6/2017 |

* cited by examiner

TERMINAL BLOCK

BACKGROUND

The present disclosure relates to a terminal block.

A conventional terminal block to be attached to a device, such as the terminal block described in JP 2011-160619A, includes a connector having a tubular shape and a seating formed on the outer periphery of the connector. The seating that is to be fixed to the housing of the device so as to close an opening of the housing. In addition, in the terminal block according to JP 2011-160619A, a plurality of reinforcement ribs stand on the front surface side of the seating (the side opposite to the device) in the axial direction of the tubular connector, and these ribs improve the rigidity of the seating.

SUMMARY

In the terminal block described above, a space surrounded by the reinforcement ribs is formed in the front surface of the seating. Therefore, when water splashes on the terminal block from the side of the front surface of the seating, the water may enter gaps between reinforcement ribs, and the water may pool between the ribs.

An exemplary aspect of the disclosure provides a terminal block capable of preventing water from entering gaps between reinforcement ribs of the seating.

A terminal block according to the present disclosure is a terminal block that is to be provided on a housing of a device that is to be mounted on a vehicle, the terminal block including: a connector that has a tubular shape; and a seating that is formed on an outer periphery of the connector, and is to be fixed to the housing so as to close an opening of the housing, wherein the seating includes: a first wall that extends in a direction that intersects an axial direction of the connector; a second wall that faces the first wall in the axial direction of the connector; a rib that is provided between the first wall and the second wall so as to connect the first wall and the second wall with each other; and a space that is partitioned by the rib between the first wall and the second wall, and the space is open in a direction that intersects the axial direction of the connector.

According to the present disclosure, it is possible to provide a terminal block capable of preventing water from entering gaps between reinforcement ribs of a seating.

DETAILED DESCRIPTION OF EMBODIMENTS

Description of Embodiment of Present Disclosure

Figure 1:
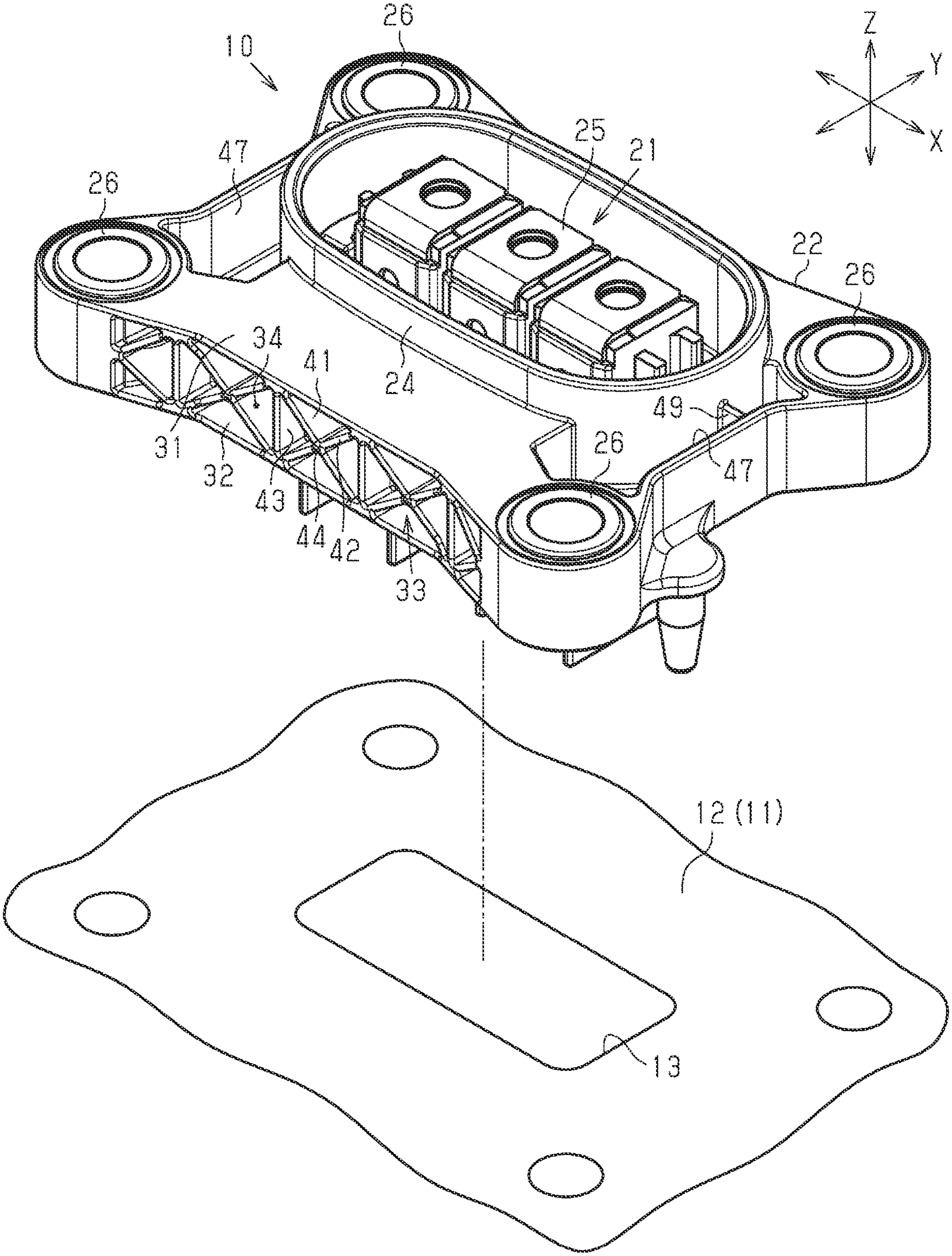
FIG. 1 is a perspective view of a terminal block according to an embodiment.

First, aspects of the present disclosure will be listed and described.

A terminal block according to the present disclosure is as follows.

[1] A terminal block that is to be provided on a housing of a device that is to be mounted on a vehicle, the terminal block including: a connector that has a tubular shape; and a seating that is formed on an outer periphery of the connector, and is to be fixed to the housing so as to close an opening of the housing, wherein the seating includes: a first wall that extends in a direction that intersects an axial direction of the connector; a second wall that faces the first wall in the axial direction of the connector; a rib that is provided between the first wall and the second wall so as to connect the first wall and the second wall with each other; and a space that is partitioned by the rib between the first wall and the second wall, and the space is open in a direction that intersects the axial direction of the connector.

With this configuration, when water splashes on the terminal block from the side of the front surface of the seating, it is possible to prevent the water from entering the space partitioned by the rib between the first wall and the second wall. Therefore, it is possible to prevent water from entering the space between the reinforcement ribs of the seating.

[2] It is preferable that the rib includes a first rib and a second rib that intersect each other. With this configuration, it is possible to desirably improve the rigidity of the seating.

[3] It is preferable that, in a state where the terminal block is attached to the housing, the sealing member is compressed by being sandwiched between the housing and the second wall at a position where the sealing member surrounds the opening. With this configuration, it is possible to seal the gap between the housing of the device and the second wall with the sealing member to prevent water from entering the opening of the housing.

[4] It is preferable that the second wall is provided with a housing groove in which the sealing member is to be disposed. With this configuration, it is possible to stably hold the sealing member using the housing groove of the second wall.

[5] It is preferable that the seating is provided with a plurality of fastening-target portions that are to be fastened and fixed to the housing, and the first wall and the second wall are formed so as to connect the fastening-target portions with each other. With this configuration, it is possible to improve the rigidity of the section between the fastening-target portions of the seating using the first wall, the second wall, and the rib between the first and second walls.

[6] It is preferable that the seating is provided with a standing rib that stands thereon in the axial direction of the connector, and a recessed portion that is partitioned by the standing rib and is open in the axial direction of the connector, and the recessed portion is provided with a drainage hole that brings an inside and an outside of the recessed portion into communication with each other. With this configuration, it is possible to discharge water that has entered the recessed portion partitioned by the standing rib, to the outside of the recessed portion through the drainage hole, and therefore it is possible to prevent water from pooling in the recessed portion.

[7] It is preferable that the first wall and the second wall are provided on side portions of the terminal block in a longitudinal direction thereof when the terminal block is seen in the axial direction of the connector, and the standing rib and the recessed portion are provided on side portions of the terminal block in a lateral direction thereof when the terminal block is seen in the axial direction of the connector. With this configuration, it is possible to realize a more desirable configuration of the terminal block that has a longitudinal direction when seen in the axial direction of the connector.

Details of Embodiment of Present Disclosure

Specific examples of a terminal block according to the present disclosure will be described below with reference to the drawings. It should be noted that the present disclosure is not limited to these examples, and is indicated by the scope of claims, and is intended to include all modifications within the meaning and scope equivalent to the scope of claims. It should be noted that the term “parallel” in the present disclosure does not mean parallel in a strict sense, but has a broader range of meaning, and the effect of the present disclosure can be achieved if objects are considered to be parallel within this range. Similarly, the term “orthogonal” in the present disclosure does not mean orthogonal in a strict sense, but has a broader range of meaning, and the effect of the present disclosure can be achieved if objects are considered to be orthogonal within this range.

As shown in FIG. 1, a terminal block 10 according to the present embodiment is to be attached to a housing 11 of a device that is to be mounted on a vehicle. Note that, in the drawings, the X axis of the X, Y, and Z axes orthogonal to each other represents a longitudinal direction X of the terminal block 10, the Y'axis represents a width direction Y of the terminal block 10, and the Z-axis represents a height direction Z of the terminal block 10.

The terminal block 10 includes a tubular connector 21 and a seating 22 that is formed so as to extend from the outer periphery of the connector 21 along the XY plane in a flange shape.

The seating 22 is to be fixed to an attachment surface 12 of the housing 11. The attachment surface 12 according to the present embodiment has a flat shape. In addition, the attachment surface 12 according to the present embodiment is configured to face upward and intersect with the direction of gravity. The attachment surface 12 is provided with an opening 13 that brings the inside and the outside of the housing 11 into communication with each other. The seating 22 is to be fixed to the attachment surface 12 so as to close the opening 13 of the housing 11. Also, the terminal block 10 is to be attached to the attachment surface 12 so that the height direction Z thereof is orthogonal to the attachment surface 12.

Connector 21

The connector 21 is provided in a central portion of the terminal block 10 in a plan view (in a view that is orthogonal to the attachment surface 12, which is a view in the height direction Z in the present embodiment). In the following description, a view in the height direction Z of the terminal block 10 is simply referred to as a “plan view”.

The connector 21 includes a tubular fitting portion 24 to which a mating connector (not shown) is to be fitted, and a plurality of terminals 25 that are arranged on the inner periphery side of the fitting portion 24. The fitting portion 24 and the seating 22 are, for example, injection-molded components that are made of a synthetic resin material. That is to say, the fitting portion 24 and the seating 22 are formed so as to be integrated with each other. Note that the axial direction (opening direction) of the connector 21 (the fitting portion 24) coincides with the height direction Z of the terminal block 10, i.e., a direction orthogonal to the attachment surface 12.

Figure 3:
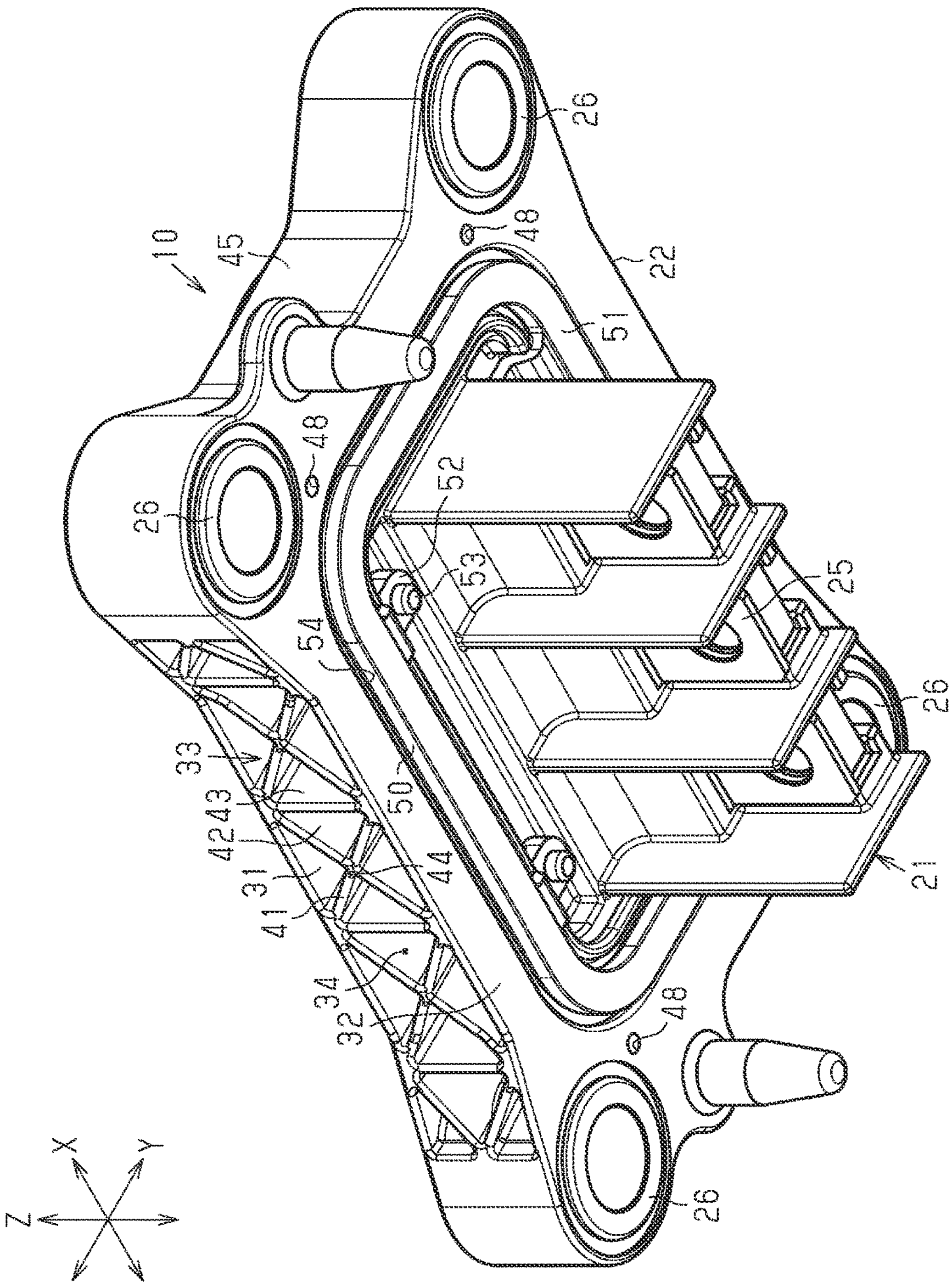
FIG. 3 is a perspective view of the terminal block according to the embodiment seen from the back surface side.

As shown in FIGS. 1 and 3, the plurality of terminals 25 of the connector 21 are arranged one after another in the longitudinal direction X of the terminal block 10. In addition, the plurality of terminals 25 are arranged so as to penetrate through the seating 22 from the front surface side to the back surface side. One end of each terminal 25 (the end on the back surface side of the seating 22) is inserted into the housing 11 through the opening 13, and is connected to a terminal of a device (not shown) provided in the housing 11. Also, the other end of each terminal 25 (the end on the front surface side of the seating 22) is connected to a terminal of a mating connector that is to be attached to the fitting portion 24 from the opposite side to the device.

Seating 22

Figure 2:
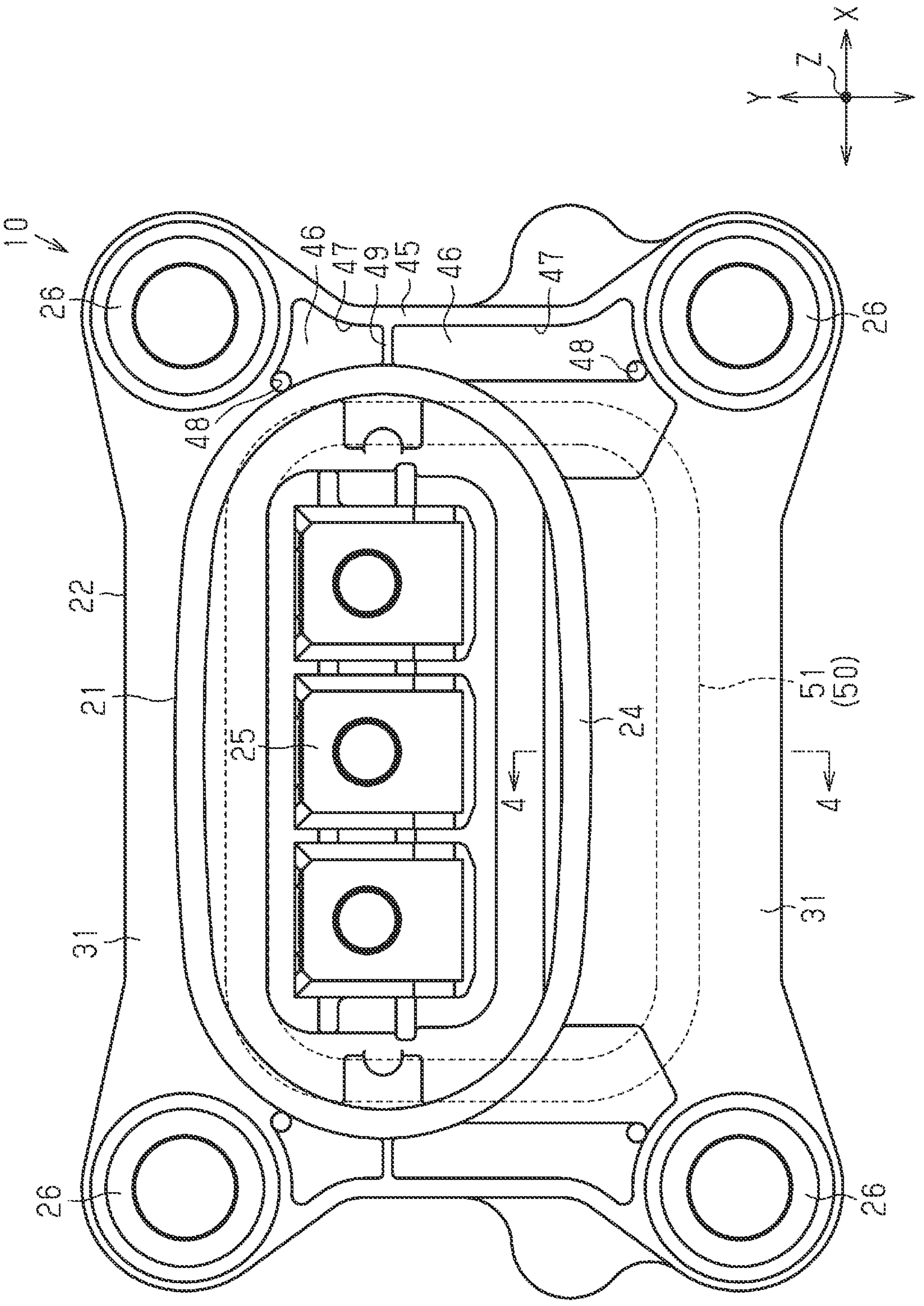
FIG. 2 is a plan view of the terminal block according to the embodiment.

As shown in FIGS. 1 and 2, the seating 22 has a substantially rectangular shape in a plan view. That is to say, the length of the seating 22 in the longitudinal direction X is longer than the length thereof in the width direction Y. Also, in the following description, the side of the seating 22 that faces the attachment surface 12 is referred to as a “back surface side” and the opposite side is referred to as a “front surface side”.

Collars 26 that each have a tubular shape and serve as a fastening-target portion are respectively embedded in the four corners of the seating 22 in a plan view, through insert molding. Each collar 26 is made of a material (for example, a metal material) that is more rigid than the synthetic resin material used to form the seating 22. Each collar 26 is fastened and fixed to the attachment surface 12 using bolts (not shown). Thus, the seating 22 is fixed to the attachment surface 12. Note that the central axis of each collar 26 (i.e., the bolt attaching direction) in the present embodiment is parallel to the height direction Z of the terminal block 10.

Figure 4:
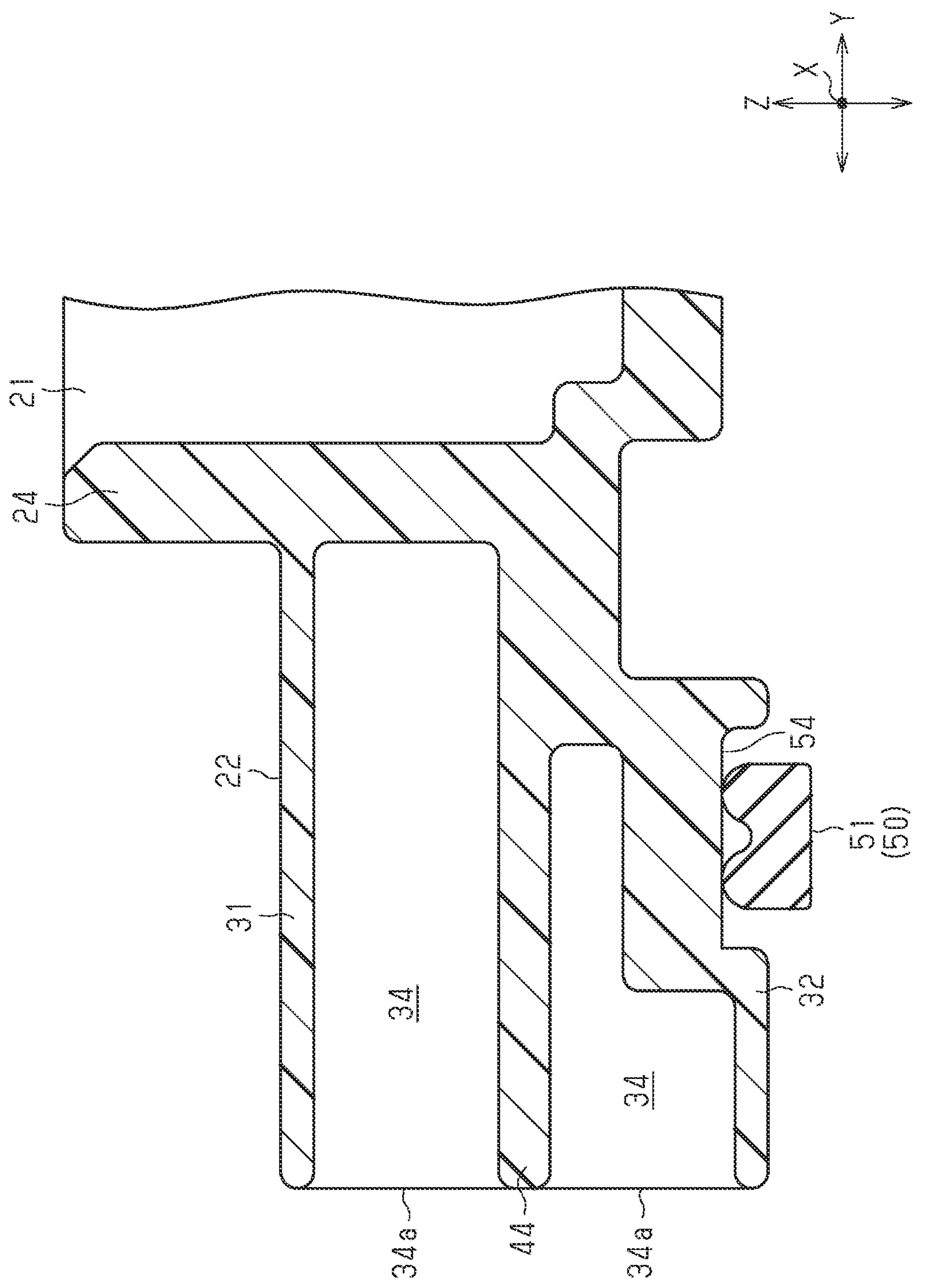
FIG. 4 is a cross-sectional view taken along a 4-4 line shown in FIG. 2.

As shown in FIGS. 1, 3, and 4, the seating 22 includes a first wall 31 and a second wall 32 that face each other in the height direction Z, reinforcement ribs 33 formed between the first wall 31 and the second wall 32, and spaces 34 partitioned by the ribs 33 between the first wall 31 and the second wall 32.

First Wall 31 and Second Wall 32

The first wall 31 and the second wall 32 extend from the outer surface of the fitting portion 24 in the width direction Y. The first wall 31 has a flat shape that extends along the XY plane that is orthogonal to the height direction Z. The second wall 32 is located on the attachment surface 12 side with respect to the first wall 31. In the present embodiment, the first wall 31 constitutes the front surface of the seating 22, and the second wall 32 constitutes the back surface of the seating 22.

As shown in FIGS. 1 and 2, the first wall 31 is formed so as to connect two collars 26 that are lined up in the longitudinal direction X. The first wall 31 is formed on two sides of the fitting portion 24 in the width direction Y. Also, as shown in FIG. 3, the second wall 32 is formed so as to have a ring shape around the connector 21 that includes the terminals 25.

Ribs 33

As shown in FIGS. 1, 3, and 4, the ribs 33 are formed between the first wall 31 and the second wall 32 that face each other in the height direction Z of the terminal block 10, the axial direction of the connector 21 (the direction in which the tubular fitting portion 24 is open). The ribs 33 according to the present embodiment include first ribs 41, second ribs 42, and third ribs 43.

A plurality of third ribs 43, each formed in a flat shape that extends along the YZ plane that is orthogonal to the longitudinal direction X, are lined up in the longitudinal direction X. Each of the third ribs 43 is formed between the first wall 31 and the second wall 32. Each of the third ribs 43 extends from the outer surface of the fitting portion 24 in the width direction Y. That is to say, each of the third ribs 43 is connected to the outer surface of the fitting portion 24.

A first rib 41 and a second rib 42 are inclined with respect to the YZ plane, and intersect in an X shape when seen in the width direction Y. In the present embodiment, an intersection 44 of a first rib 41 and a second rib 42 is set at the center position in the height direction Z between the first wall 31 and the second wall 32. The first ribs 41 and the second ribs 42 extend from the outer surface of the fitting portion 24 in the width direction Y. That is to say, the first ribs 41 and the second ribs 42 are connected to the outer surface of the fitting portion 24. The first ribs 41 and the second ribs 42 are formed in the spaces partitioned by the plurality of third ribs 43. Note that the ribs 33 including the third ribs 43, the first ribs 41, and the second ribs 42 are formed on the two side portions (sides) of the seating 22 in the width direction Y sandwiching the connector 21.

Spaces 34

Spaces 34 that are partitioned by the ribs 33 between the first wall 31 and the second wall 32 in the height direction Z are open in a direction that intersects the axial direction of the connector 21 that is parallel to the height direction Z. In the present embodiment, the spaces 34 have opening ends 34*a* that are open toward the outer side in the width direction Y, i.e., toward the side opposite to the connector 21. Note that the spaces 34 according to the present embodiment include spaces partitioned by the first wall 31 and the first and second ribs 41 and 42, spaces partitioned by the second wall 32 and the first and second ribs 41 and 42, and spaces partitioned by the first to third ribs 41 to 43.

As shown in FIGS. 1 and 2, the seating 22 is provided with standing ribs 45 that constitute the outer walls of the seating 22 on the two sides thereof in the longitudinal direction X at positions on the two sides with respect the connector 21 in the longitudinal direction X. Each standing rib 45 stands in the height direction Z, Each standing rib 45 is formed so as to connect the collars 26 lined up in the width direction Y.

As shown in FIG. 2, bottom walls 46 are formed between the standing ribs 45 and the fitting portion 24 of the connector 21. That is to say the seating 22 is provided with the recessed portions 47 (recesses) that are constituted by the standing ribs 45, the fitting portion 24, and the bottom walls 46. The terminal block 10 according to the present embodiment is also provided with standing ribs 49 that stand in the height direction Z, which are different from the standing ribs 45, The standing ribs 49 are formed so as to extend from the bottom walls 46 in the height direction Z, and connect the outer surface of the fitting portion 24 with the standing ribs 45. The standing ribs 49 are formed in wall shapes that intersect with the width direction Y. The standing ribs 49 partition the recessed portions 47.

The bottom walls 46 of the recessed portions 47 are provided with drainage holes 48 that penetrate through the bottom walls 46 in the height direction Z. The drainage holes 48 are formed outside the sealing main body 51 described below in a plan view so that the inside of the recessed portions 47 and the outside of the terminal block 10 are in communication with each other. The lower end portions (the end portions on the exhaust side) of the drainage holes 48 face the aforementioned attachment surface 12.

Sealing Member 50

As shown in FIGS. 3 and 4, the terminal block 10 is provided with a sealing member 50 (seal) on the back surface of the seating 22. The sealing member 50 is made of an elastic material such as rubber or elastomer. The sealing member 50 includes a sealing main body 51 that has a ring shape in a plan view, and a plurality of fixed portions 52 that each extend from the sealing main body 51 toward the inner periphery. Each fixed portion 52 is fixed to a fixing pin 53 that extends in the height direction Z on the back surface of the seating 22. The sealing main body 51 is disposed in a housing groove 54 that is formed in the back surface of the second wall 32 so as to have a ring shape.

The sealing main body 51 is larger in size than the opening 13 so as to be able to surround the opening 13 of the housing 11 in a plan view. When the seating 22 is fixed to the housing 11, the sealing main body 51 is sandwiched between the attachment surface 12 of the housing 11 and the seating 22 in a compressed state at a position where the sealing main body 51 surrounds the opening 13. As a result, the gap between the seating 22 and the attachment surface 12 is sealed, and water is prevented from entering the opening 13.

Also, in the seating 22, the outer end portions of the first and second walls 31 and 32 in the width direction Y and the outer end portions of the first to third ribs 41 to 43 in the width direction Y are located outside the sealing main body 51 in a plan view. That is to say the opening ends 34*a* of the spaces 34 formed between the first wall 31 and the second wall 32 are located outside the sealing main body 51 in a plan view.

Actions of the present embodiment will be described.

The seating 22 is provided with the first and second walls 31 and 32 that connect the collars 26 lined up in the longitudinal direction X with each other, and ribs 33 are formed between the first and second walls 31 and 32. The seating 22 is provided with the standing ribs 45 and the bottom walls 46 that connect the collars 26 lined up in the width direction Y. Therefore, when each collar 26 is fastened and fixed to the attachment surface 12, the sections between the collars 26 of the seating 22 are prevented from warping so as to protrude toward the front surface when subjected to a reaction force from the seal main body 51. In particular, in the present embodiment, the seating 22 is made of a synthetic resin material with relatively low rigidity, and therefore it is more important to improve the rigidity of the seating 22.

The effects of the present embodiment will be described.

(1) In the seating 22, the spaces 34 partitioned by the ribs 33 at positions between the first wall 31 and the second wall 32 are open to a direction (the width direction Y in the present embodiment) that intersects the axial direction of the connector 21. With this configuration, when water splashes on the terminal block 10 from the side of the front surface of the seating 22 (i.e., a side in the height direction Z), it is possible to prevent the water from entering the spaces 34 partitioned by the ribs 33 between the first wall 31 and the second wall 32. Therefore, it is possible to prevent water from entering the spaces 34 between the reinforcement ribs 33 of the seating 22.

(2) The ribs 33 include a first rib 41 and a second rib 42 that intersect each other. With this configuration, it is possible to desirably improve the rigidity of the seating 22.

(3) The back surface side of the seating 22 is provided with a ring-shaped sealing member 50. In a state where the terminal block 10 is attached to the housing 11, the sealing member 50 is compressed by being sandwiched between the housing 11 and the second wall 32 at a position where the sealing member 50 surrounds the opening 13. With this configuration, it is possible to seal the gaps between the housing 11 of the device and the second wall 32 with the sealing member 50 to prevent water from entering the opening 13 of the housing 11.

(4) The second wall 32 is provided with the housing groove 54 in which the sealing main body 51 of the sealing member 50 is to be disposed. With this configuration, it is possible to stably hold the sealing member 50 using the housing groove of the second wall 32.

(5) The seating 22 is provided with the plurality of collars 26 that are to be fastened and fixed to the housing 11, and the first wall 31 and the second wall 32 are formed so as to connect the collars 26 with each other. With this configuration, it is possible to improve the rigidity of the sections between the collars 26 of the seating 22 using the first wall 31, the second wall 32, and the ribs 33 between the first and second walls 31 and 32.

(6) The seating 22 is provided with the standing ribs 45 and 49 that extend in the axial direction of the connector 21 and the recessed portions 47 that are partitioned by the standing ribs 45 and 49 and are open in the axial direction of the connector 21, and the recessed portions 47 are provided with the drainage holes 48 that bring the inside and the outside of the recessed portions 47 in communication with each other. With this configuration, it is possible to discharge water that has entered the recessed portions 47 partitioned by the standing ribs 45 and 49, to the outside of the recessed portions 47 through the drainage holes 48, and therefore it is possible to prevent water from pooling in the recessed portions 47.

(7) The first wall 31 and the second wall 32 are provided on side portions of the terminal block 10 in the longitudinal direction X when the terminal block 10 is seen in the axial direction of the connector 21. The standing ribs 45 and 49 and the recessed portions 47 are provided on the sides of the terminal block 10 in the lateral direction (the width direction Y) thereof when the terminal block 10 is seen in the axial direction of the connector 21. That is to say the recessed portions 47 into which water is more likely to enter than into the spaces 34 between the first wall 31 and the second wall 32 are provided on the sides of the terminal block 10 in the lateral direction (the width direction Y. Thus, it is possible to reduce the area occupied by the recessed portions 47 in the plan view of the terminal block 10. Therefore, it is possible to realize a more desirable configuration of the terminal block 10 that has a longitudinal direction X when seen in the axial direction of the connector 21.

The present embodiment may be modified and implemented as follows. The present embodiment and the following modified examples can be implemented in combination with each other as long as no technical contradiction arises.

The configurations of the ribs 33 in the seating 22 are not limited to those in the above embodiment, and may be appropriately changed according to the size, shape, rigidity of the material, and so on, of the seating 22.

For example, it is possible to employ a configuration in which one or two kinds of ribs of the first ribs 41, the second rib 42, and the third ribs 43 included in the ribs 33 are omitted. Also, it is possible to employ a configuration where the ribs 33 include intermediate ribs that are parallel to the first and second walls 31 and 32, between the first and second walls 31 and 32. Also, the intermediate ribs may be configured to connect the collars 26 with each other.

Also, the shape of the ribs 33 seen in the width direction Y is not limited to the X shape constituted by the first and second ribs 41 and 42, and may be a lattice or a honeycomb shape, for example.

Also, the number and size of the first and second ribs 41 and 42 are not limited to those in the above-described embodiment. For example, one first rib 41 and one second rib 42 may be provided so as to have substantially the same length as the first wall 31 and the second wall 32 in the width direction Y.

It is possible to employ a configuration in which the first wall 31 is inclined with respect to the XY plane that is orthogonal to the height direction Z. Also, it is possible to employ a configuration in which the second wall 32 is inclined with respect to the XY plane that is orthogonal to the height direction Z. Also, it is possible to employ a configuration in which the first wall 31 and the second wall 32 are not parallel to each other.

The first wall 31 and the second wall 32 may also be formed between the collars 26 lined up in the width direction Y, and the ribs 33 may be formed between the first wall 31 and the second wall 32.

A drainage hole that penetrates through the second wall 32 in the height direction Z may be formed in the region outside the housing groove 54 of the second wall 32 (i.e., outside the sealing region of the sealing main body 51). With this configuration, it is possible to discharge water that has entered the spaces 34, to the outside of the spaces 34 outside the sealing region of the sealing main body 51 through the drainage hole.

The material of the seat 22 is not limited to a synthetic resin material, and may be a metal material such as aluminum.

The external shape of the seating 22 in a plan view is not limited to that in the above embodiment, and may be, for example, a substantially square shape, i.e., a shape in which the length in the longitudinal direction X and the length in the width direction Y are substantially equal to each other.

The fitting portion 24 of the terminal block 10 according to the embodiment may be referred to as a hood that has a terminal housing chamber that may be tubular and houses the plurality of terminals 25. The seating 22 of the terminal block 10 according to the embodiment may be referred to as a flange that is integrated with the tubular fitting portion 24 and extends in a predetermined direction in a plane that may be an XY plane. The tubular fitting portion 24 and the seating 22 according to the embodiment may be made of the same synthetic resin. The second wall 32 of the seating 22 according to the embodiment may be referred to as a base surface configured to face the attachment surface 12 when the terminal block 10 is fastened to the attachment surface 12. The first wall 31 of the seating 22 may be referred to as an upper surface that is parallel to the second wall 32, The spaces 34 according to the embodiment may be referred to as polygonal hollow cells or polygonal tubular hollow cells. Each of the spaces 34 may have a cell axis line that extends in a predetermined one direction that is parallel to a predetermined in-plane direction, and each of the spaces 34 may be open in the outermost surface of the seating 22 in a radial direction. The ribs 33 (41, 42, and 43) according to the embodiment may be referred to as reinforcing plates.

The fitting portion 24 of the terminal block 10 according to the embodiment may be referred to as a hood that has a terminal housing chamber that may be tubular and houses the plurality of terminals 25. The seating 22 of the terminal block 10 according to the embodiment may be referred to as a flange that is integrated with the tubular fitting portion 24 and extends in a predetermined direction in a plane that may be an XY plane. The tubular fitting portion 24 and the seating 22 according to the embodiment may be made of the same synthetic resin. The second wall 32 of the seating 22 according to the embodiment may be referred to as a base surface configured to face the attachment surface 12 when the terminal block 10 is fastened to the attachment surface 12. The first wall 31 of the seating 22 may be referred to as an upper surface that is parallel to the second wall 32. The spaces 34 according the embodiment may be referred to as polygonal hollow cells or polygonal tubular hollow cells. Each of the spaces 34 may have a cell axis line that extends in a predetermined one direction that is parallel to a predetermined in-plane dirtion, and each of the spaces 34 may be open in the outermost surface of the seating 22 in a radial direction. The ribs 33 (41, 42, and 43) according to the embodiment may be referred to as reinforcing plates.

The present disclosure includes the following aspects. Reference numerals are given to some of the components of the exemplary embodiments, not for limitation, but for facilitating understanding. Some of the matters described in the following aspects may be omitted, or some of the matters described in the aspects may be selected or extracted and combined.

[Supplementary Note 1] One aspect of the present disclosure is directed to a terminal block (10) that is to be used with a vehicle device housing (11) that includes a terminal block attachment surface (12) that has an opening (13), and the terminal block (10) may include:

- a tubular hood (24) that has a terminal housing;
- a plurality of conductive terminals (25) that are housed in the terminal housing;
- a flange (22) that is configured so that the terminal block (10) can be retrofit to the terminal block attachment surface (12) of the vehicle device housing (11), and extends in an in-plane direction (XY plane); and
- a plurality of polygonal hollow cells (34) provided in the flange (22),
- wherein each of the plurality of polygonal hollow cells (34) may have no opening in an upper surface (31) of the flange (22), and each of the plurality of polygonal hollow cells (34) may have an opening in an outermost surface of the flange (22) in a radial direction so as to facilitate drainage of water from the cells (34).

[Supplementary Note 2] Accordingto one aspect, of the present disclosure, each of the plurality of polygonal hollow cells (34) may have a cell axial line that extends in a predetermined one direction (Y) that is parallel to the in-plane direction (XY surface).

[Supplementary Note 3] In one aspect of the present disclosure, the flange (22) may include:

- a base surface (32) configured to face the terminal block attachment surface (12) when the terminal block (10) is fastened to the terminal block attachment surface (12), and extend in the in-plane surface direction (XY surface);
- the upper surface (31) that is parallel to the base surface (32) and extends in the in-plane surface direction (XY surface); and
- a plurality of reinforcing plates (41, 42, 43) that are formed between the base surface (32) and the upper surface (31), and intersect, and/or are orthogonal to, the in-plane surface direction (XY surface),
- wherein the base surface (32), the upper surface (31), and the plurality of reinforcing plates (41, 42, 43) may be configured to partition the plurality of polygonal hollow cells (34).

[Supplementary Note 4] In one aspect of the present disclosure, each of the plurality of reinforcing plates (41, 42, 43) may have an end surface that is exposed from the outermost surface of the flange (22) in the radial direction.

[Supplementary Note 5] In one aspect of the present disclosure, the plurality of polygonal hollow cells (34) may be open in the outermost surface of the flange (22) in the radial direction.

[Supplementary Note 6] In one aspect of the present disclosure, each of the plurality of polygonal hollow cells (34) may be a polygonal tubular hollow cell (34).

[Supplementary Note 7] In one aspect of the present disclosure, the terminal block (10) may further include

- a plurality of tubular collars (26) that are configured to be engaged with a plurality of fastening elements for fastening the terminal block (10) to the terminal block attachment surface (12) of the vehicle device housing (11), and are embedded in the flange (22).

The invention claimed is:

1. A terminal block that is to be provided on a housing of a device that is to be mounted on a vehicle, the terminal block comprising:

- a connector that has a tubular shape; and
- a seating that is formed on an outer periphery of the connector, and is to be fixed to the housing so as to close an opening of the housing, wherein:
  - the seating includes:
    - a first wall that extends in a direction that intersects an axial direction of the connector;
    - a second wall that faces the first wall in the axial direction of the connector;
    - a rib that is provided between the first wall and the second wall so as to connect the first wall and the second wall with each other; and
    - a space that is partitioned by the rib between the first wall and the second wall, and
  - the space is open in a direction that intersects the axial direction of the connector.

2. The terminal block according to claim 1,

- wherein the rib includes a first rib and a second rib that intersect each other.

3. The terminal block according to claim 1, wherein:

- a back surface of the seating is provided with a seal that has a ring shape, and
- in a state where the terminal block is attached to the housing, the seal is compressed by being sandwiched between the housing and the second wall at a position where the seal surrounds the opening.

4. The terminal block according to claim 3,

- the second wall is provided with a housing groove in which the seal is to be disposed.

5. The terminal block according to claim 1, wherein:

- the seating is provided with a plurality of fastening-target portions that are to be fastened and fixed to the housing, and
- the first wall and the second wall are formed so as to connect the plurality of fastening-target portions with each other.

6. The terminal block according to claim 1, wherein:

- the seating is provided with a standing rib that stands thereon in the axial direction of the connector, and a recess that is partitioned by the standing rib and is open in the axial direction of the connector, and
- the recess is provided with a drainage hole that brings an inside and an outside of the recess into communication with each other.

7. The terminal block according to claim 6, wherein:

- the first wall and the second wall are provided on sides of the terminal block in a longitudinal direction thereof when the terminal block is seen in the axial direction of the connector, and the standing rib and the recess are provided on sides of the terminal block in a lateral direction thereof when the terminal block is seen in the axial direction of the connector.

* * * * *